NARROW BAND TELEVISION WITH INTERLACE CONVERSION
Filed July 20, 1962
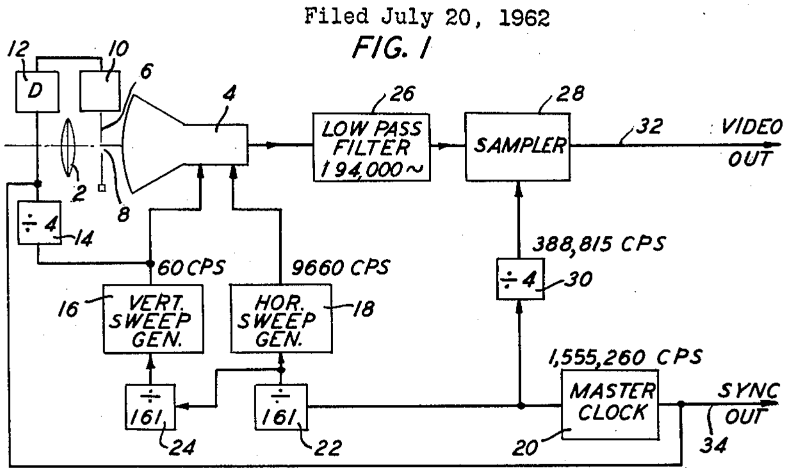
FIG. 1
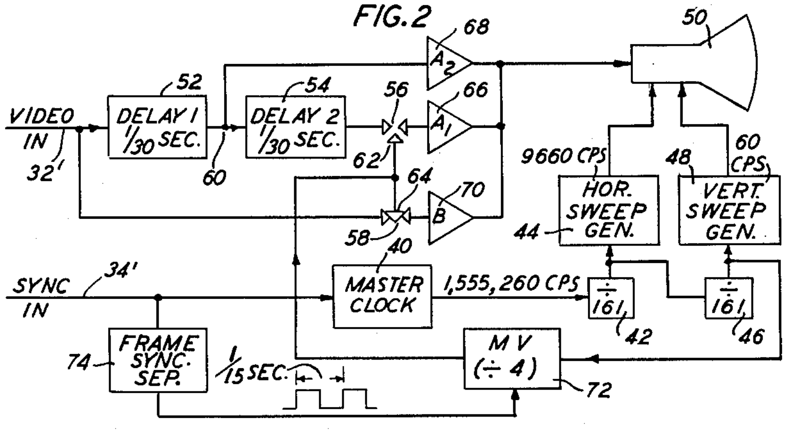
FIG. 2
FIG. 3
| | | | | | | | | |
|---|---|---|---|---|---|---|---|---|
| $a_1$ | $b_2$ | $c_1$ | $d_2$ | $a_1$ | $b_2$ | $c_1$ | $d_2$ | $a_1$ |
| $b_2$ | $c_1$ | $d_2$ | $a_1$ | $b_2$ | $c_1$ | $d_2$ | $a_1$ | $b_2$ |
| $c_1$ | $d_2$ | $a_1$ | $b_2$ | $c_1$ | $d_2$ | $a_1$ | $b_2$ | $c_1$ |
| $d_2$ | $a_1$ | $b_2$ | $c_1$ | $d_2$ | $a_1$ | $b_2$ | $c_1$ | $d_2$ |
| $a_1$ | $b_2$ | $c_1$ | $d_2$ | $a_1$ | $b_2$ | $c_1$ | $d_2$ | $a_1$ |
INVENTOR
E. F. BROWN
BY Harry C. Hart
ATTORNEY 3,136,847
Patented June 9, 1964

3,136,847

NARROW BAND TELEVISION WITH INTERLACE CONVERSION

Earl F. Brown, Piscataway Township, Middlesex County, N.J., assignor to Bell Telephone Laboratories, Incorporated, New York, N.Y., a corporation of New York Filed July 20, 1962, Ser. No. 211,175
10 Claims. (Cl. 178—6.8)

This invention relates to television, and particularly to television of the point-to-point or "closed circuit" variety, as compared with broadcast television.

The high quality of the images reproduced from broadcast television waves is rendered possible only through the provision of transmission frequency bands of enormous width. Such wide bands are economically justified only because a large number of receivers can be counted on to tune in to a single program and so, in effect, to share its cost. The wide band, in turn, requires a radio carrier wave of such high frequency that transmission is largely along a line of sight. This restricts transmission along the earth's surface to comparatively short distances.

It is quite otherwise with point-to-point or "closed circuit" television of the sort which might be provided as a vision-signal accompaniment to a telephone conversation. Here, the cost must be borne by the individual subscriber. In the case of transmission path lengths such as to require tandem repeaters—and this includes a large fraction of present day telephone conversations—the cost of a conventional video signal band would be prohibitive.

Accordingly many proposals have been made with a view to bringing the video signal frequency band within tolerable limits. One approach to this problem, adopted in W. E. Kock et al. 2,895,005 and in M. A. Clarke et al. 2,922,843, is to store one entire video signal frame out of a sequence of $n$ such frames, discarding the others; to transmit the stored frame slowly, thus economizing frequency space; to store it as received; to speed it up, and to reproduce it $n$ times. This approach requires, at the receiver, storage facilities of special kinds; i.e., facilities with which storage and recovery can take place at different speeds. Moreover, these facilities must be duplicated, in order that storage of one frame may take place while its predecessor is being reproduced.

It has also been proposed, notably in P. M. G. Toulon Patent 2,479,880 that advantages might ensue from the adoption of horizontal or "dot" interlace between the successive fields of a frame, in addition to, or in contrast to the conventional vertical or "line" interlace. Tests have shown that when the interlace factor is three or more, the background of the reproduced image and portions of the image itself appear to creep or crawl across the viewing screen. This crawl, which is due to the short decay time of the brightness of each elemental area of the reproduced image, is of course extremely annoying to the viewer. On the other hand, an interlace factor of two, conventional with vertical interlace, makes for no additional frequency band compression when applied to horizontal interlace and little or no improvement in quality.

The present invention combines these earlier proposals in such a way as to retain the meritorious features of each, without their objectionable ones. Briefly, a new frame of the scene to be transmitted is stored, at the transmitter station, at intervals of T seconds so that the frame frequency is $$\frac{1}{T}$$

exposures per second. The interval T may, for example, be one fifteenth second. This may conveniently be done with a conventional camera shutter which exposes the photo-sensitive screen of a conventional camera tube to the scene for a time that is short compared with the interval T. The resulting static image is then scanned by the camera tube beam on a horizontal dot interlace basis to develop consecutive dot-interlaced field signals. With a dot interlace factor $n$, e.g., four or eight, the resulting field frequency is $$\frac{n}{T}\text{ c.p.s.}$$

e.g., 60 c.p.s. or 120 c.p.s. The video signals representing the interlaced fields are transmitted consecutively to the receiver station. There, each one is reproduced as it arrives but only in combination with one or more of its predecessors, locally delayed for the purpose. The local delay and the combination are so carried out that the interlace factor, for reproduction, is not more than two. This by itself eliminates the objectionable crawl which would result from retention, in reproduction, of the much larger transmitter interlace factor $n$. Thus at least two and, more generally, $$\frac{n}{2}$$

of the transmitter fields have been reproduced in the course of a single receiver field period $$\frac{T}{n}$$

In the ensuring receiver field period the next transmitter field is reproduced, again in combination with one or more delayed predecessors, thus to fill all the gaps in the reproduced image left after the completion of the first receiver field scan.

The reproduction is now complete after the lapse of only two of the $n$ field periods which go to make up the frame period T. The remainder of the available frame period is now turned to account by repeating the foregoing operations with no change. This serves both to hold the apparent field rate high, thus to hold flicker effects to a low level, and to recharge each element of the viewing screen at the frequency $$\frac{n}{2T}$$

thus rapidly to restore its brightness level, and so to prevent apparent fading from frame to frame. With the short decay times which must characterize the electrosensitive screen if "crosstalk" from frame to frame is to be prevented, such fading would otherwise be unavoidable.

As a refinement the objectionable character of any residual apparent flicker at the field frequency is further reduced by so coordinating the number of individual picture elements developed in the course of each single horizontal scan with the interlace factor that, for every element reproduced in any one field, all four of its nearest neighbors are reproduced either in the immediately preceding field or in the field immediately following. The required relation for the total number S of dots per scanning line is $$S=nr_h\pm1$$

where $n$ is the dot interlace factor at the transmitter, and $r_h$ is an integer.

A similar relation for the number L of lines per field acts to locate each reproduced image element in the correct position, and so to prevent the appearance of flicker from field to field and from frame to frame. The relation is $$L=nr_v\pm1$$

where $r_v$ is an integer. The integers $r_v$ and $r_h$ may be the same or different, in dependence on the aspect ratio desired for the image.

The invention will be fully apprehended from the following description of an embodiment in which, illustratively, the video signals are developed at the transmitter station on the basis of a fourfold dot interlace while the reconstitution of the image takes place at the receiver station with a twofold dot interlace. This description is to be read in connection with the appended drawings in which:

FIG. 1 is a schematic block diagram showing transmitter apparatus in accordance with the invention;

FIG. 2 is a schematic block diagram showing receiver apparatus in accordance with the invention; and FIG. 3 is a tabular diagram illustrating the dot-interlace program of the invention.

Referring now to FIG. 1, a scene to be transmitted is focused by a lens 2 on the photosensitive screen of a television camera tube 4. A camera shutter 6 is interposed in the light path for briefly exposing the screen to the scene fifteen times each second thus to store on it, for each such exposure, an essentially static image of the scene, in which distortions, due to the presence in the scene of any moving objects, are minimized. Advantageously, the shutter is of the "focal plane" variety in which a slit 8 of appropriate width is swept across the screen from top to bottom by a shutter control mechanism 10. This sweeping movement may track the vertical sweeping movement of the cathode beam of the tube 4 and lag behind it by a short interval, e.g., by the time occupied by two horizontal sweeps of the beam.

The shutter control mechanism 10 is actuated after such a delay, introduced by a delay device 12, by the output of a four-to-one divider 14 which, in turn, is actuated by the vertical sweep control which is arranged to take place at 60 cycles per second, i.e., at the frequency of the output sawtooth wave of a vertical sweep generator 16. Horizontal sweeps of the beam are controlled by the output of a horizontal sweep generator 18 that operates, illustratively, 161 times as rapidly as the vertical sweep generator 16, i.e., at 9,660 cycles per second. A master clock 20 delivering pulses at the rate of 1,555,260 pulses per second, controls both of these sweeps. Its output pulse train is reduced in frequency by a factor 161 by a divider 22 to provide the 9,660 cycles per second control for the horizontal sweep generator 18 and this, in turn, is again reduced by another factor 161 by a divider 24 to provide the 60 cycles per second control for the vertical sweep generator 16.

The output of the camera tube 4 after passing through a filter 26 of the low-pass configuration of which the cutoff frequency is 194,000 cycles per second is applied to a sampler 28 which may be of conventional construction, that operates at 388,815 cycles per second, i.e., slightly more than twice the cutoff frequency of the filter 26. This sampling frequency is developed by a divider 30 which reduces the frequency of the master clock 20 by a factor 4.

With this arrangement and these proportions, the sampler 28 operates 161 times, spread over four full cycles of the horizontal sweep generator 18 and the video signal applied to the outgoing channel 32 consists of a sequence of four dot-interlaced fields which together make up each single frame. The field frequency of 60 cycles per second is that of the vertical sweep of the cathode beam while the frame frequency of 15 cycles per second is that of the output of the divider 14 and of the movements of the shutter 6. The fourfold dot interlace among the several fields which make up each frame is a consequence of the selected frequencies and of the coordination between the bandwidth of the filter filter 26 and the sampling frequency. Blanking signals, conventionally developed in synchronism with the line and field sweep frequencies, may be combined with the video signal in the customary way.

This video signal is transmitted over the channel 32 to a receiver station along with a synchronizing signal, transmitted over an auxiliary channel 34, constituted of the pulse sequence of the master clock 20, in combination with a frame synchronizing signal derived from the divider 14. This serves to hold the operations of the receiver in synchronism and in phase with those at the transmitter station on a dot-to-dot basis as well as on a field-to-field and frame-to-frame basis.

The video signal and the synchronizing signal which appear respectively on the main and auxiliary channels 32, 34 are transmitted over a facility such as a telephone channel, or channels, which may include repeaters as necessary, to a receiver station, shown in FIG. 2. Here the high-frequency component of the synchronizing signal is applied to a master clock 40 to hold its operation at the same frequency as that of the master clock 20 at the transmitter station and in precise synchronism therewith. If preferred, a conventional pulse counter may be employed. In a fashion identical to that described above in connection with FIG. 1, the pulse train output of the master clock 40 is first reduced by a factor 161 by a divider 42 to enforce the operation of a horizontal sweep generator 44 at 9,660 cycles per second and this frequency is, in turn, reduced by another factor 161 by a divider 46 to control a vertical sweep generator 48 at 60 cycles per second. The sawtooth output waves of the sweep generators 44, 48 operate in conventional fashion to cause the cathode beam of a cathode ray reproducer tube 50 to sweep its electro-sensitive sceen laterally at 9,660 sweeps per second and vertically at 60 sweeps per second. Thus the beam makes 161 lateral sweeps for each vertical sweep and, aside from obliteration by the blanking signal, the samples of the video wave developed by the sampler 28 at the transmitter station in the course of each lateral sweep of the beam of the camera tube 4 are received during a corresponding, and synchronized, sweep of the beam of the reproducer tube 50.

The video signal developed on the main channel 32 appears at the upper input terminal 32' of the receiver apparatus and is applied to two delay devices 52, 54 connected in tandem. Each of these is proportioned to introduce a retardation of precisely two field periods or one half frame period, i.e., of $\frac{1}{30}$ second. Electromagnetic propogation lines, which serve these purposes well, can be constructed with all the necessary precision.

In accordance with the invention the doubly delayed output of the second delay device 54 is applied to the input terminal of the viewing tube 50 through a first switch 56. The undelayed input to the first delay device 52 is applied to the viewing tube 50 through a second switch 58 and the singly delayed video signal, as it appears at the common connection 60 between the first delay device 52 and the second delay device 54, is applied directly to the viewing tube 50.

The first switch 56 is shown in the "open" condition to be closed on the application of a voltage to its control terminal 62 while the second switch 58 is shown in the "closed" condition to be opened on the application of the same voltage to its control terminal 64. Thus when either of the switches 56, 58 is open, the other one is closed, so that their conduction paths are established in alternation by the voltage applied to the control terminals 62, 64.

To compensate for incidental losses that may be introduced by the delay devices an amplifier 66 of gain $A_1$ is included in the first-named output path and an amplifier 68 of gain $A_2$ is included in the third-named output path. For the sake of symmetry a buffer 70 is included in series with the second-named output path which carries the undelayed signal.

The three video signals delivered by the amplifiers 66, 68 and the buffer 70, variously delayed as described above, and variously selected by the switches 56, 58 as described below, are together applied to the input terminal of the viewing tube 50.

In accordance with the invention the switches 56, 58 are operated in the following fashion. The 60 cycle output derived from the divider 46 is again reduced in frequency by a factor 4, i.e., to 15 cycles per second, as by conventional bistable multivibrators 72. The output conductor of the multivibrators 72 is connected to the control terminals 62 and 64 of switches 56, 58 thus simultaneously to establish the first path and disestablish the second path and to reverse this condition once every thirtieth second.

Correctness of the phase relations among the operations of these switches is ensured as taught by E. M. Roschke in his Patent 2,504,354 by application to the multivibrators of the frame-frequency component of the synchronizing signal which may be selected from the incoming train of synchronizing pulses by a conventional separator 74.

The operation of the system of FIG. 2 will now be understood to be as follows. Aside from a brief initial transient condition which takes place when the apparatus is first put into operation and endures only for 1/30 second, at the instant of arrival of the video signal representing the third field of the first transmitter frame, the retarded video signal representing the first field of the first frame appears at the common point 60 and is therefore applied by way of the amplifier 68 to the viewing tube 50 and the viewing tube, under the influence of this video signal and under control of its horizontal and vertical sweep generators 44, 48 reconstructs all of the dots of which this first transmitter field is constituted. At the same time, the third transmitter field video signal, appearing at the input point of the delay device 52, is applied without retardation through the switch 58, now actuated by the multivibrators 72, to the input terminal of the viewing tube 50. Thus, simultaneously with the reconstruction of the dots constituting the third transmitter field, the viewing tube 50 also reconstructs the dots constituting the first transmitter field. Gaps, however, are left between them, since the second and fourth fields have not yet been reconstituted.

One sixtieth second later, and as the second vertical sweep of the viewing tube beam commences, the retarded second transmitter field signal is applied directly to the viewing tube and, along with it, the unretarded fourth transmitter field signal is applied to the viewing tube through the switch 58, still closed. In the course of this second sweep the tube 50 reconstructs all of the dots of the second and fourth transmitter fields, thus filling in all of the gaps left by the first sweep. Thus the entire frame has been reconstituted in the course of two vertical sweeps and with a twofold interlace, in contrast to the fourfold interlace at the transmitter station.

These two vertical sweeps together occupy 1/30 second. When they have been terminated, the multivibrator 72 acts to open the switch 58 and close the switch 56. During the ensuing 1/30 second, throughout which the switch 56 remains closed, the entire process is repeated through the action of the second delay device 54. During the first half of this 1/30 second, i.e., during the third vertical sweep of the viewing tube beam, the first transmitter field, still of the first frame, as retarded by the second delay device 54 is reconstituted and, along with it, the third transmitter field as it appears at the common point 60. During the next 1/60 second, i.e., in the course of the fourth vertical sweep of the viewing tube beam, the fourth field and the second field, still of the first frame, are similarly reconstituted. As before, the reconstitution proceeds on the basis of a twofold dot interlace and is an exact repetition of the twofold dot interlaced reproduction which took place during the first two sweeps of the beam tube 50.

Throughout this period the open condition of the switch 58 prevents application to the viewing tube 50 of new field signals derived from the second frame. At this time, however, the condition of the two switches is reversed by the multivibrators 72. The first two fields of the second frame having now been stored in the delay device 52, the first field of the second frame appears at the common connection 60 while the third field of the second frame appears at the input point of the first delay device 52 and reconstruction of the several fields, of which the second frame is constituted, proceeds as before on the basis of a repeated twofold dot interlace.

It will be observed that at no point of the process is there any reconstitution of any field of one frame along with any field of another frame, earlier or later. This feature is of advantage in the prevention of objectionable "smears" which might otherwise appear in the case of movement of any object in the field of view of the camera tube.

Disregarding the times within each field in which horizontal flyback of the cathode beams takes place after each horizontal sweep, and likewise the times for vertical flyback that take place between each vertical sweep and the next, the illustrative embodiment develops, at the transmitter station, 161 distinguishable dots in each horizontal line and these, together with those of the other lines of the frame, are developed in the course of four different field scans. At the receiver station of the illustrative embodiment these 161 distinguishable dots are laid down on a horizontal line in the course of two vertical sweeps and again in the course of the next two vertical sweeps.

The number 161 exceeds by unity the product of the transmitter interlace factor, in this case four, by an integer $r_h$, in this case 40. In other words, the number 161 is a specific instance of the more general number $nr_h+1$. Since the number 159, one less than 160, would have served equally well, the required relation between the interlace factor $n$ and the dot number S may be more generally stated to be $$S=nr_h\pm 1$$

The pattern in which the dots of the four transmitter fields of any one frame are reconstituted at the receiver station in the course of two successive field sweeps is illustrated, for the case of $r_h=2$, in FIG. 3. Designating the successive transmitter fields by the letters $a$, $b$, $c$ and $d$ and the successive receiver sweeps by the numbers 1, 2 FIG. 3 shows the four transmitter fields all properly interlaced together, the dots of the $a$ field and of the $c$ field bearing the subscript 1, indicating they are laid down in the course of the first receiver sweep while the dots of the $b$ field and of the $d$ field are labeled with subscript 2 indicating that they are laid down in the course of the second receiver sweep. It will be noted that each line contains not eight distinguishable picture elements but nine, i.e., one more than the product of the transmitter interlace factor 4 by the integer 2. By analogy with the illustrative number 159 above, seven dots would have served the purpose as well as nine.

With the nine picture elements per line shown, examination reveals that any single one which bears a particular subscript is surrounded by four others bearing the other subscript. For example, the nearest neighbor of the element $c_1$ of the third line are $h_2$ to its left and above it and $d_2$ to its right and below it. Similarly, the nearest neighbor of the element $d_2$ of the second line are $c_1$ to its left and above it and $a_1$ to its right and below it. With this arrangement, no horizontal or vertical path can be found containing picture elements that are laid down in any single scan. Thus the flicker effect which holds with respect to any element is restricted to such small horizontal and vertical dimensions as to be unobservable while any flicker effect which may be observable holds as between adjacent diagonal lines. Such a flicker has been shown by tests to be distinctly less objectionable at any flicker rate, than either horizontal flicker or vertical flicker at the same rate.

FIG. 3 also shows five horizontal lines. This number is an instance of the more general number $$L=nr_v\pm 1$$

In the figure, the integer $r_v$ has the value unity. In the illustrative embodiment it has the value 40. This relation acts to locate each reproduced image element at the correct point of the final image, and so to prevent undesirable flicker from field to field and from frame to frame.

As a practical matter time must of course be allowed during which horizontal flyback of the cathode beam of the viewing tube takes place after the sweep of each horizontal line. So, too, with vertical flyback after the completion of each vertical sweep. Such times are commonly of the order of ten percent of the useful sweep times. During these flyback periods the cathode beam is blanked out in the conventional fashion by application to the viewing tube of blanking signals inserted at the transmitter station. These blanks do not alter the pattern of reconstituted dots, as illustrated in FIG. 3 except at its borders, and there only by obscuring a few columns and a few rows that would appear if flyback times were infinitesimal. That is to say, the number of lines and dots actually reconstituted in the illustrative case is in each case less than 161 (or 159).

At the price of somewhat more elaborate storage than is provided by the two delay devices, a sixfold or an eightfold dot interlace pattern developed at the transmitter station may be converted into a twofold dot interlace pattern at the receiver station. Furthermore, if desired, dot interlace at the receiver station may be wholly dispensed with, and a twofold or threefold dot interlace pattern developed at the transmitter station may be reconstituted, through the agency of delay devices and switches, such as those shown, without interlace.

What is claimed is:

1. Television apparatus which comprises
means at a transmitter station and operative at a frame repetition rate for storing consecutive static images of a field of view,
means, operative at a field repetition rate for developing, from each of said images, consecutive field signals that are severally representative of at least two horizontally interlaced fields of said image,
means for transmitting said field signals to a receiver station
and, at said receiver station,
means for storing each received field signal for an integral number of field periods,
means for combining each newly received field signal with a field signal earlier received and stored, to develop a composite field signal,
said combining means being proportioned to preserve the horizontal interlace among said fields,
an image reproducer device having a viewing screen and means for developing, modulating and deflecting an energy beam,
means including said deflecting means for causing said beam to scan said screen at said field repetition rate,
and means for modulating said scanning beam by said composite field signal.

2. Television apparatus which comprises
means at a transmitter station and operative at a frame repetition rate for storing consecutive static images of a field of view,
means, operative at a field repetition rate for developing, from each of said images, consecutive field signals that are severally representative of at least two horizontally interlaced fields of said image,
means for transmitting said field signals to a receiver station
and, at said receiver station,
means for storing each received field signal for an integral number of field periods,
an image reproducer device having a viewing screen and means for developing, modulating and deflecting an energy beam,
means including said deflecting means for causing said beam to scan said screen at said field repetition rate,
means for modulating said beam, in the course of each scan, by an incoming field signal,
and means for also modulating said beam, during the course of said scan, by one of said stored field signals,
whereby at least two different fields of said image are reconstituted in the course of a single one of said scans.

3. In a television system,
means at a transmitter station for developing, in each of a succession of frame periods, a plurality of dot-interlaced field signals, of which the interlace factor is at least four, and,
at a receiver station, beam sweeping means for reconstituting picture elements from at least two of said field signals in the course of one sweep,
and for reconstituting the remaining ones of said field signals in the course of a different sweep,
said total reconstitution occupying one half of a transmitter frame period,
and means for duplicating said reconstitution in the remaining half of said transmitter frame period,
whereby said picture elements are reconstituted without introduction of crawl effects and with minimal flicker.

4. Television transmitter apparatus which comprises
a master timing wave source proportioned to deliver a first train of pulses at a dot frequency,
a first divider for reducing said dot frequency by a factor $$S=nr_h\pm1$$

where $n$ is a dot interlace factor and $r_h$ is an integer, to develop a line frequency pulse train,
a second divider for reducing said line frequency by a factor $$L=nr_v\pm1$$

where $r_v$ is an integer,
to develop a field frequency pulse train,
a camera tube having a photosensitive screen and beam sweeping means,
means for causing the beam to sweep the screen in one direction at the line frequency,
means for causing the beam to sweep the screen in a perpendicular direction at the field frequency,
means for deriving a video signal from said tube in the course of said sweeps,
a third divider for reducing said dot frequency by the factor $n$ to develop a sampling frequency pulse train,
and means for sampling said video signal under control of said sampling frequency pulse train.

5. In combination with apparatus as defined in the preceding claim,
a fourth divider for reducing said field frequency by said factor $n$ to develop a frame frequency pulse train,
means for briefly exposing the screen of the camera tube to a scene,
and means for repeating said exposures under control of the pulses of said frame frequency train.

6. Television receiver apparatus for reconstituting an image from consecutive dot-interlaced field signals which comprises
means for storing each received field signal for an integral number of field periods,
means for combining a received field signal with a field signal earlier received and stored, to develop a composite field signal,
said combining means being proportioned to preserve the dot interlace among said fields,
an image reproducer device having a viewing screen and means for developing, modulaing and deflecting an energy beam,
means including said deflecting means for causing said beam to scan said screen at the field repetition rate
and means for modulating said scanning beam by said composite field signal.

7. Television receiver apparatus for reconstituting an image from consecutive dot-interlaced field signals which comprises
means for storing each received field signal for an integral number of field periods,
an image reproducer device having a viewing screen and means for developing, modulating and deflecting an energy beam,
means including said deflecting means for causing said beam to scan said screen at the field repetition rate,
means for modulating said beam, in the course of each scan, by a received field signal,
and means for also modulating said beam, during the course of said scan, by one of said stored field signals,
whereby at least two different fields of said image are reconstituted in the course of a single one of said scans.

8. Television receiver apparatus for accepting dot-interlaced field signals and for reconstituting an image therefrom which comprises
an image reproducer device having a viewing screen and means for developing, deflecting and modulating an energy beam,
means including said deflecting means for sweeping said beam over said screen in synchronism with incoming field signals,
a delay device proportioned to retard incoming video signals by an integral number of field periods,
means for applying said incoming video signals to said delay device to develop retarded signals,
means for modulating said energy beam by said incoming video signals,
and means for also modulating said beam by said retarded signals.

9. Apparatus as defined in the preceding claim wherein said delay device is proportioned to introduce a delay of two field periods
whereby, in the course of a single sweep of said beam, reconstitution of a particular field is accompanied by reconstitution of its predecessor next but one.

10. Television receiver apparatus for accepting dot-interlaced field signals and for reconstituting an image therefrom which comprises
an image reproducer device having a viewing screen and means for developing, deflecting and modulating an energy beam,
means including said deflecting means for sweeping said beam over said screen in synchronism with incoming field signals,
two wave propagation devices connected in tandem, each proportioned to retard video signals applied to it by two field periods,
means for applying incoming video signals to the input terminal of the first device to develop singly retarded video signals at the common terminal of said devices and doubly retarded video signals at the output terminal of the second device,
means for modulating said energy beam by said singly retarded video signals,
means for combining the unretarded video signals and the doubly retarded video signals in alternation at one half the field repetition rate with the singly retarded video signals to develop composite video signals,
and means for modulating said energy beam by said composite video signals.

References Cited in the file of this patent

UNITED STATES PATENTS 2,939,909 Toulon ---------------- June 7, 1960